No. 816,618. PATENTED APR. 3, 1906.
W. THOMSON & F. W. CLARK.
MARINER'S COMPASS.
APPLICATION FILED OCT. 3, 1903.

Witnesses
Harold Reed
Mabel Hayes

Inventors:
William Thomson
and Francis W. Clark
By Knight Bros
Attorneys

UNITED STATES PATENT OFFICE.

WILLIAM THOMSON, OF LARGS, AND FRANCIS WOOD CLARK, OF GLASGOW, SCOTLAND.

MARINER'S COMPASS.

No. 816,618.     Specification of Letters Patent.     Patented April 3, 1906.

Application filed October 3, 1903. Serial No. 175,711.

*To all whom it may concern:*

Be it known that we, WILLIAM THOMSON, (BARON KELVIN,) of Largs, and FRANCIS WOOD CLARK, foreman, of 18 Cambridge street, Glasgow, Scotland, have invented certain new and useful Improvements in the Mariner's Compass, of which the following is a specification.

This invention relates to an improved suspension for ships' compass-bowls. This suspension is so constructed that the vibration caused by the ship's engines, the roll or pitch of the vessel is taken up and softened before reaching the compass-card. The suspension is also so arranged that it gently resists but at the same time allows the compass-bowl to swing in every direction. We attain this all-round equal cushion-like resistance by the lateral or torsion motion of tightening links and springs.

In order that our invention may be properly understood and readily carried into effect, we have hereunto appended one sheet of drawings, of which—

Figure 1:
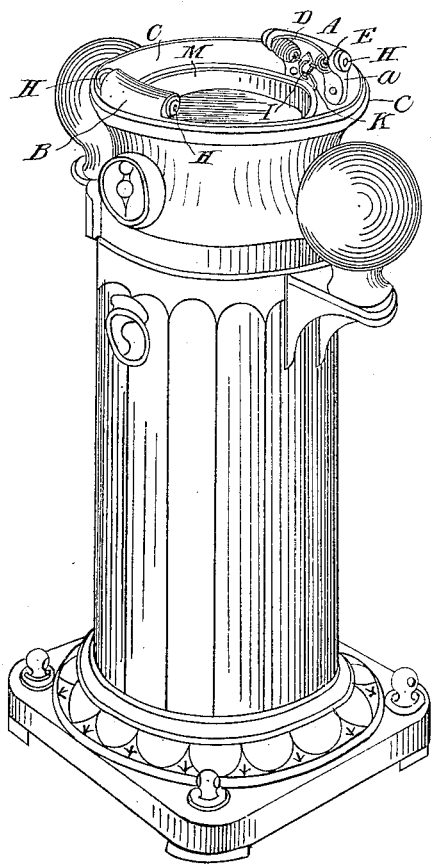
Figure 2:
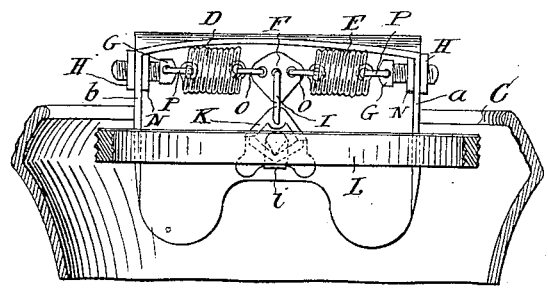

Figure 1 is a perspective view of a binnacle to which our improvements are applied; and Fig. 2 is a detached view, drawn to an enlarged scale, of one of the hoods or brackets, springs, and attachments carried upon a binnacle-flange and supporting a gimbal-ring and embodying our invention, the opposite hood being exactly similar.

In carrying the invention into practice the above improvements consist in one of its simplest forms in constructing so as to shelter the suspension two brackets or hoods A and B, fixed on the binnacle-flange C, either on the fore or aft or thwart ship line and at opposite points. The said brackets or hoods A and B have two right-angle flanges or sides $a$ $b$, say, about five inches apart. We take four spiral springs of the necessary strength for the weight of the compass-bowl which they support and fix links into a loop form on each end of the four springs. We then form these four springs into two sets D and E by connecting each pair to a diamond-shaped piece of brass F or other hard non-magnetic metal to the two inside links O. The two outside links P are attached to the ends of two bolts G, which pass through the flanges or sides $a$ $b$ of the brackets and are secure by a nut H outside. By drawing the bolts G through the flanges or sides of the hood $a$ $b$ by the outside nuts H we get the necessary strain and adjustment. We then clamp the bolts firmly in their place by inside nuts N, which prevent any jar of the bolts and springs. From the center of the diamond-shaped piece of metal F we suspend by one or more links I a specially-constructed V-shaped hanger K to carry the knife-edges of the gimbal-ring L, which has a bent-down extension $i$ to prevent any tendency to displacement. The weight of the gimbal-ring L and compass-bowl M, hanging on these tightened horizontal springs D E, gives a vertical deflection of about five-eighths of an inch. The constant lateral resistance of the springs D and E and links O and P soften the rolling, pitching, or other motions tending to disturb the compass bowl and card.

We claim—

1. In a mariner's compass, the combination with the binnacle and the compass-bowl, of means for suspending the compass-bowl within the binnacle, said means comprising a pair of horizontal spiral springs arranged approximately parallel to the top of the bowl and having connection with the binnacle and the bowl.

2. In a mariner's compass, the combination with the binnacle and the compass-bowl, of means for suspending the compass-bowl within the binnacle, said means comprising horizontal spiral springs arranged at opposite sides of the binnacle and having connection with the bowl.

3. In a mariner's compass, the combination with the binnacle and the compass-bowl, of means for suspending the bowl within the binnacle, said means comprising a pair of horizontal spiral springs connected with the binnacle, and a link connection between said springs, said link connection being provided with means for supporting the bowl.

4. In a mariner's compass, the combination with the binnacle and the compass-bowl, of means for suspending the bowl within the binnacle, said means comprising a pair of horizontal spiral springs, a link connection between said spiral springs, and a link connection between each spiral spring and the binnacle.

5. In a mariner's compass, the combination with the binnacle and the compass-bowl, of means for suspending the bowl within the binnacle, said means comprising a pair of horizontal spiral springs, a link connection between said spiral springs, and a link connection between each spiral spring and the binnacle, and means for straining said suspending means.

6. In a mariner's compass, the combination with the binnacle and the compass-bowl, of means for suspending the bowl within the binnacle, said means comprising a plurality of horizontal spiral springs, said springs being arranged in series on opposite sides of the binnacle, the springs of each series having link connection with the binnacle and link connection with each other, and the link connections between the springs being provided with means for supporting the bowl.

In testimony whereof we have hereunto affixed our signatures.

WILLIAM THOMSON.
FRANCIS WOOD CLARK.

In presence of—
 JOHN LIDDLE,
 AGNES MACKINTOSH.